United States Patent [19]

Miyazaki

[11] Patent Number: 5,693,990
[45] Date of Patent: Dec. 2, 1997

[54] VIBRATION ISOLATING APPARATUS AND VIBRATION ISOLATING TABLE

[75] Inventor: Toshihiro Miyazaki, Kodaira, Japan

[73] Assignee: Bridgestone Corporation, Tokyo, Japan

[21] Appl. No.: 523,137

[22] Filed: Sep. 5, 1995

[30] Foreign Application Priority Data

Sep. 6, 1994 [JP] Japan ................... 6-212647

[51] Int. Cl.$^6$ ................... F16F 15/03
[52] U.S. Cl. ................... 310/15; 310/51; 310/90.5; 248/550
[58] Field of Search ................... 310/15, 17, 19, 310/51, 90.5; 318/127, 128, 629, 249; 248/638, 550

[56] References Cited

U.S. PATENT DOCUMENTS

| | | | |
|---|---|---|---|
| 3,529,188 | 9/1970 | Gearing | 310/27 |
| 4,161,666 | 7/1979 | Bacsanyi et al. | 310/27 |
| 4,976,415 | 12/1990 | Murai et al. | 267/136 |
| 5,427,362 | 6/1995 | Schilling et al. | 267/140.14 |
| 5,449,985 | 9/1995 | Kanemitsu et al. | 318/128 |

FOREIGN PATENT DOCUMENTS

| | | |
|---|---|---|
| 1 267 619 | 5/1968 | Germany . |
| 62-23357 | 1/1987 | Japan . |
| 3-66952 | 3/1991 | Japan . |
| 1 222 933 | 4/1986 | U.S.S.R. . |

OTHER PUBLICATIONS

Brül & Kjœr, "PM Mini–Shaker Type 4810 Instruction Manual", Jan. 1979, pp.1–7.

Primary Examiner—Steven L. Stephan
Assistant Examiner—Judson H. Jones
Attorney, Agent, or Firm—Oliff & Berridge

[57] ABSTRACT

A vibration isolating apparatus and a vibration isolating table for reliably controlling vibration of an object of vibration isolation. A coil-mounting main body is mounted on the vibration isolating table and a yoke-mounting main body is mounted on a floor. A coil of the coil-mounting main body is disposed in a gap of a yoke where magnetic flux passes through, in a state in which the coil does not contact the yoke. An acceleration sensor for detecting a vibration is mounted on the vibration isolating table and is connected to a controlling device. The controlling device receives an acceleration detecting signal from the acceleration sensor and controls an electric current applied to the coil such that vibration acting on the vibration isolating table becomes zero. Since the coil and the yoke are disposed in a non-contact state, even though vibration shifted in any direction other than a direction in which the coil moves is generated on the floor, the vibration is not transmitted to the vibration isolating table.

21 Claims, 12 Drawing Sheets 5,693,990

VIBRATION ISOLATING APPARATUS AND VIBRATION ISOLATING TABLE

BACKGROUND OF THE INVENTION

1. Field of the Invention

The present invention relates to a vibration isolating apparatus and a vibration isolating table for actively controlling very little vibration, and particularly to a vibration isolating apparatus which is suitable for isolating vibration of a precision optical instrument, an electron microscope, a measuring instrument, a precision balance, a precision machine tool, a vibration isolating floor or the like, and to a vibration isolating table which is suitable for use in mounting these instruments thereon.

2. Description of the Related Art

Recently, in a system in which a body to be vibrated is supported by a moving body, there has been thought of an active vibration-isolating method for preventing transmission of vibration to the body to be vibrated. In this active vibration-isolating method, the body to be vibrated is equipped with a mechanism for applying force from outside, and vibration of the body to be vibrated is isolated by force being applied actively to the body to be vibrated.

As a mechanism used for this type of active vibration-isolating method, there is known a force generating mechanism utilizing force generated in an electric conductor which is placed in a magnetic field and to which an electric current is applied, i.e., a so-called electromagnetic actuator-type vibration isolating apparatus.

As shown in FIG. 12, this type of electromagnetic actuator-type vibration isolating apparatus 100 has a pot-type yoke 102 with a cylindrical permanent magnet 101. A coil 105 wound around a bobbin 104 is disposed in a gap where magnetic flux passes through. The bobbin 104 is supported by the yoke 102 via a pair of metallic plates 106. A vibrating portion 110 mounted on an object of vibration isolation is formed integrally with a leading end of the bobbin 104. As shown in FIG. 18, this vibration isolating apparatus 100 is applied to, for example, a vibration isolating table 112 or the like, on which a microscope, a precision equipment or the like, being apt to be easily affected by vibration, is mounted.

The vibration isolating table 112 is supported by a floor 116 via vibration absorbing devices 114 or the like. The vibration isolating apparatus 100 is disposed on the floor 116 under the vibration isolating table 112 in a state in which an axial direction of the vibration isolating apparatus 100 is placed horizontally. The vibrating portion 110 is fixed to a lower portion of the vibration isolating table 112.

In this state, when the vibration isolating table 112 is going to move, the vibrating portion 110 generates force in a direction of stopping movement of the vibration isolating table 112 so as to control vibration of the vibration isolating table 112.

However, the vibrating portion 110 of this conventional vibration isolating apparatus 100 is supported by the pair of metallic plates 106 and moves only in a predetermined direction (in the above-described example, a horizontal direction). For this reason, there exists a drawback in that, when the floor 116 vibrates in a vertical direction, this vertical vibration is transmitted to the vibration isolating table 102 via the metallic plates 106.

Meanwhile, as a related art of the present invention, there is disclosed in Japanese Patent Application Laid-Open No. 3-66952, a method of controlling an electromagnetic actuator built-in between a vibrating body and a non-vibrating body in accordance with an amplitude and a frequency of vibration.

SUMMARY OF THE INVENTION

In view of the above-described circumstances, it is an object of the present invention to provide a vibration isolating apparatus which prevents vibration in a predetermined direction and which prevents vibration of any direction other than the predetermined direction from being transmitted to an object of vibration isolation, and also to provide a vibration isolating table whose vibration can be controlled reliably.

In accordance with a first aspect of the present invention, there is provided a vibration isolating apparatus comprising: magnetic force generating means having a gap which allows magnetic flux to pass through in a direction intersecting a vibration direction and is connected to one of a vibration generating portion and a vibration receiving portion; conducting means which extends in a direction perpendicular to the magnetic flux passing through the gap and in a direction perpendicular to a predetermined vibration direction of the vibration generating portion and which is disposed within the gap in a state of being separated from the magnetic force generating means by a predetermined distance, the conducting means being connected to another of the vibration generating portion and the vibration receiving portion; and controlling means which charges the conducting means with an electric current so as to allow the conducting means to generate force acting in a direction opposite to the predetermined vibration direction with respect to the magnetic force generating means.

According to the first aspect of the present invention, the magnetic force generating means is connected to one of the vibration generating portion and the vibration receiving portion, and the conducting means is connected to another of the vibration generating portion and the vibration receiving portion. The conducting means disposed within the gap extends in the direction perpendicular to the magnetic flux passing through the gap and in the direction perpendicular to the predetermined vibration direction of the vibration generating portion. For this reason, force acting in the direction opposite to the predetermined vibration direction can be generated in the conducting means in accordance with a direction of an electric current with which the conducting means is charged, and the magnitude of force generated in the conducting means can be changed depending on an amount of electric current thereto. The controlling means charges the conducting means with an electric current so as to allow the conducting means to generate force acting in a direction opposite to the predetermined vibration direction with respect to the magnetic force generating means, so that vibration of the vibration receiving portion is controlled. Further, since the conducting means and the magnetic force generating means are separated from each other, even if the vibration generating portion vibrates in any direction other than a predetermined direction, the vibration is not transmitted to the vibration receiving portion via the vibration isolating apparatus. Thus, the vibration receiving portion which is an object of vibration isolation can be prevented from vibrating in the predetermined direction, and the conducting means and the magnetic force generating means are separated from each other by a predetermined distance. Accordingly, vibration in any direction other than the predetermined direction which is generated in the vibration generating portion is not transmitted to the vibration receiving portion.

In accordance with a second aspect of the present invention, there is provided a vibration isolating table supported by a vibration generating portion via elasticity means, comprising: magnetic force generating means having a gap which allows magnetic flux to pass through in a direction intersecting a vibration direction and is connected to one of a vibration generating portion and a vibration receiving portion; conducting means which extends in a direction perpendicular to the magnetic flux passing through the gap and in a direction perpendicular to a predetermined vibration direction of the vibration generating portion and which is disposed within the gap in a state of being separated from the magnetic force generating means by a predetermined distance, the conducting means being connected to another of the vibration generating portion and the vibration receiving portion; and controlling means which charges the conducting means with an electric current so as to allow the conducting means to generate force acting in a direction opposite to the predetermined vibration direction with respect to the magnetic force generating means.

According to the second aspect of the present invention, the magnetic force generating means is connected to one of the vibration generating portion and the vibration isolating table, and the conducting means is connected to another of the vibration generating portion and the vibration isolating table. The conducting means disposed within the gap extends in the direction perpendicular to the magnetic flux passing through the gap and in the direction perpendicular to the predetermined vibration direction of the vibration generating portion. For this reason, force acting in the direction opposite to the predetermined vibration direction of the vibration generating portion can be generated in the conducting means in accordance with a direction of an electric current applied to the conducting means, and the magnitude of force generated in the conducting means can be changed depending on an amount of electric current thereto. The controlling means allows an electric current to be applied to the conducting means such that the conducting means moves with respect to the magnetic force generating means in a direction opposite to the predetermined vibration direction of the vibration generating portion by the same distance as the vibration amount, so that vibration of the vibration isolating table is controlled. Further, since the conducting means and the magnetic force generating means are separated from each other, even if the vibration generating portion vibrates in any direction other than a predetermined direction, the vibration is not transmitted to the vibration isolating table. Thus, the vibration isolating table can be prevented from vibrating in the predetermined direction, and the conducting means and the magnetic force generating means are separated from each other by a predetermined distance. Accordingly, vibration of any direction other than the predetermined direction which is generated in the vibration generating portion is not transmitted to the vibration isolating table.

DESCRIPTION OF THE PREFERRED EMBODIMENTS

[First Embodiment]

Figure 1:
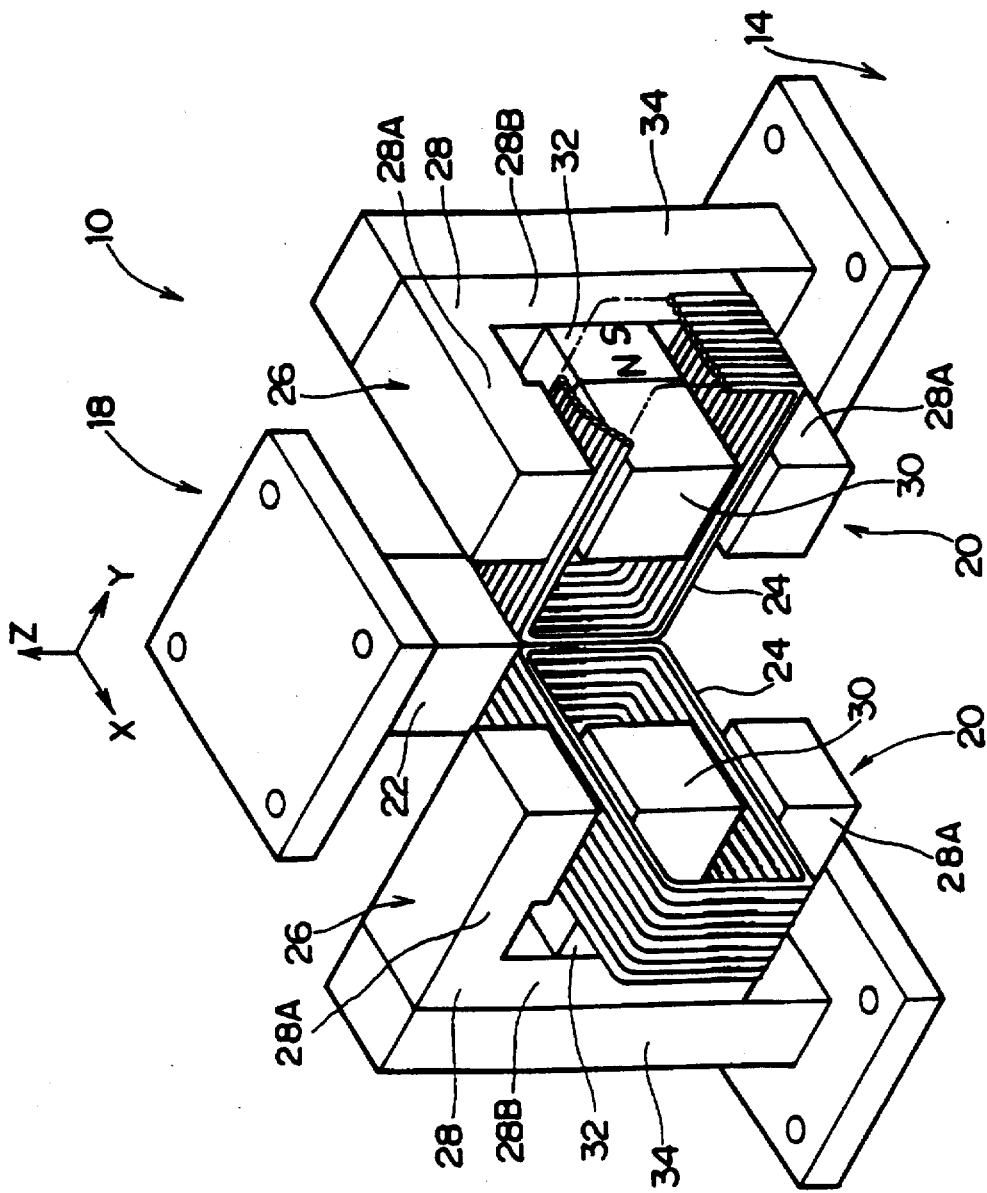
FIG. 1 is a perspective view of a vibration isolating apparatus according to a first embodiment of the present invention.

Referring now to the drawings, a vibration isolating apparatus according to a first embodiment of the present invention will be described hereinafter.

Figure 2:
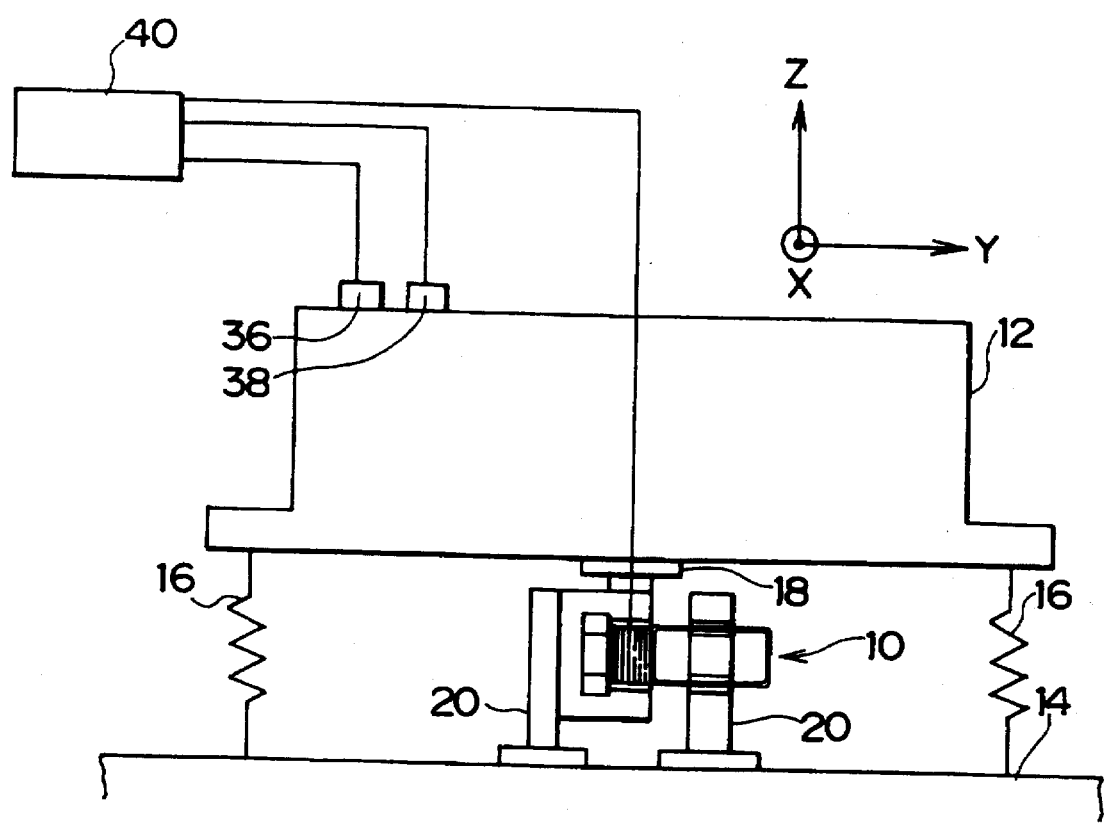
FIG. 2 is a side view of a vibration isolating table on which the vibration isolating apparatus of the first embodiment is mounted.

In FIG. 2, there is shown a vibration isolating table 12 serving as a vibration receiving portion, to which a vibration isolating apparatus 10 according to the first embodiment is applied. The vibration isolating table 12 is supported by vibration isolating devices 16 which are respectively mounted onto four corners of the vibration isolating table 12 and fixed to a floor 14 serving as a vibration generating portion. The vibration isolating apparatus 10 is disposed under the vibration isolating table 12.

As shown in FIG. 1, the vibration isolating apparatus 10 is formed from a coil-mounting main body 18 and two yoke-mounting main bodies 20. The coil-mounting main body 18 is provided with a prism-shaped mounting block 22. An upper portion of the mounting block 22 is attached to a bottom surface of the vibration isolating table 12 at the center thereof by unillustrated bolts, adhesive or the like.

Coils 24 project from side surfaces of the mounting block 22, which are respectively disposed in a direction indicated by arrow X and a direction indicated by arrow Y. These coils 24 are each wound in the shape of a rectangular frame and hardened by resins or the like. An axial direction of each of the coils 24 is disposed along a horizontal direction.

Further, the yoke-mounting main bodies 20 are respectively disposed above the floor 14 in the direction indicated by arrow X and the direction indicated by arrow Y from the coil-mounting main body 18.

These yoke-mounting main bodies 20 are each provided with a yoke 26 forming a part of magnetic force generating means. The yoke 26 of the first embodiment is formed from three components: a first member 28, a second member 30, and a permanent magnet 32 forming other part of the magnetic force generating means.

The members 28, 30 consist of magnetic substances, the first member 28 has a pair of parallel portions 28A disposed parallel to each other, and a base portion 28B which connects respective longitudinal one ends of these parallel portions 28A. The first member 28 has a substantially channel-shaped configuration.

The second member 30 has a prism-shaped configuration and is provided to form a gap between the second member 30 and each of the pair of parallel portions 28A. Further, the permanent magnet 32 is disposed and fixed between the second member 30 and the base portion 28B of the first member 28. It should be noted that the permanent magnet 32 has an N pole on the side of the second member 30 and an S pole on the side of the first member 28.

The base portion 28B of the yoke 26 is mounted on a bracket 34. The bracket 34 is fixed to the floor 14 by unillustrated bolts.

The coil 24 is, as shown in FIG. 1, inserted in the gap of the yoke 26 in such a manner as to contact neither the first member 28 nor the second member 30. Further, the size of the gap is set such that the coil 24 does not contact the yoke 26 even when the coil 24 moves in any direction within a predetermined range. It should be noted that the predetermined range referred to above is the same as an amplitude of vibration of the floor 14.

Further, there is provided enough space between the base portion 28B of the yoke 26 and the coil 24, and the coil 24 is sufficiently long from side to side in comparison with the second member 30. Accordingly, even when the floor 14 and the vibration isolating table 12 move relatively in a range larger than an amplitude of vibration, there is no possibility that the coil 24 be damaged.

As shown in FIG. 2, an acceleration sensor 36 and an acceleration sensor 38 are mounted on the vibration isolating table 12. The acceleration sensor 36 forms a part of controlling means for detecting a vibration amount in the direction of arrow X and a direction opposite thereto. The acceleration sensor 38 forms a different part of controlling means for detecting a vibration amount in the direction of arrow Y and a direction opposite thereto.

These acceleration sensors 36 and 38 are both connected to a controlling device 40 forming a further different part of the controlling means. The coils 24 are connected to the controlling device 40.

When an acceleration detecting signal from the acceleration sensor 36 is inputted to the controlling device 40, the controlling device 40 controls an electric current charged for the coil 24 projecting from the coil-mounting main body 18 in the direction of arrow Y such that vibration acting on the vibration isolating table 12 in the direction of arrow X and a direction opposite thereto becomes zero. Further, when an acceleration detecting signal from the acceleration sensor 38 is inputted to the controlling device 40, the controlling device 40 controls an electric current charged for the coil 24 projecting from the coil-mounting main body 18 in the direction of arrow X such that vibration acting on the vibration isolating table 12 in the direction of arrow Y and a direction opposite thereto becomes zero.

Namely, the controlling device 40 calculates values of vibration amount in accordance with values of the respective acceleration detecting signals from the acceleration sensors 36, 38, and then calculates current values for nullifying the calculated value of vibration amount, thereby allowing both of coils 24 to be charged with an electric current of the calculated current value. As the controlling device 40, a hardware circuit may be used, and a software with a table or an operating equation using a CPU, ROM, RAM or the like may also be used.

In operation, for example, when the floor 14 is slightly shifted in the direction of arrow Y due to vibration, the vibration isolating table 12 is also going to move in the direction of arrow Y. When the vibration isolating table 12 is about to move in the direction of arrow Y, an acceleration of the vibration isolating table 12 is detected by the acceleration sensor 38. When the controlling device 40 receives the acceleration detecting signal from the acceleration sensor 38, the controlling device 40 allows an electric current to be applied to the coil 24 projecting from the coil-mounting main body 18 in the direction of arrow X such that the acceleration becomes zero. The coil 24 to which an electric current is applied receives force of the direction opposite to that of arrow Y with respect to the yoke-mounting main body 20. The force is transmitted to the vibration isolating table 12, which in turn moves in the direction opposite to that of arrow Y. As a result, the vibration of the vibration isolating apparatus 12 in the direction of arrow Y is prevented.

Meanwhile, even when the floor 14 is slightly shifted in the direction opposite to that of arrow Y, the direction of arrow X, and the direction opposite to that of arrow X, the vibration of the vibration isolating table 12 can be prevented in a manner similar to the aforementioned. Accordingly, even if the floor 14 slightly vibrates in any horizontal direction, the vibration isolating table 12 does not move in the horizontal direction.

Incidentally, in the vibration isolating apparatus 10, the coil 24 and the yoke 26 do not contact each other. For this reason, for example, when the floor 14 vibrates in a vertical (Z) direction, there is no possibility that the vertical vibration of the floor 14 will be transmitted to the vibration isolating table 12 via the vibration isolating apparatus 10. In this embodiment, the vertical vibration of the floor 14 is absorbed by the vibration absorbing device 16, which prevents the vibration from being transmitted to the vibration isolating table 12.

[Second Embodiment]

Next, a second embodiment of the present invention will be described with reference to FIG. 3. A vibration isolating table 12 of this embodiment is adapted to control not only horizontal vibration but also vertical vibration. It should be noted that the same members as those of the first embodiment will be denoted by the same reference numerals, and a description thereof will be omitted.

Figure 3:
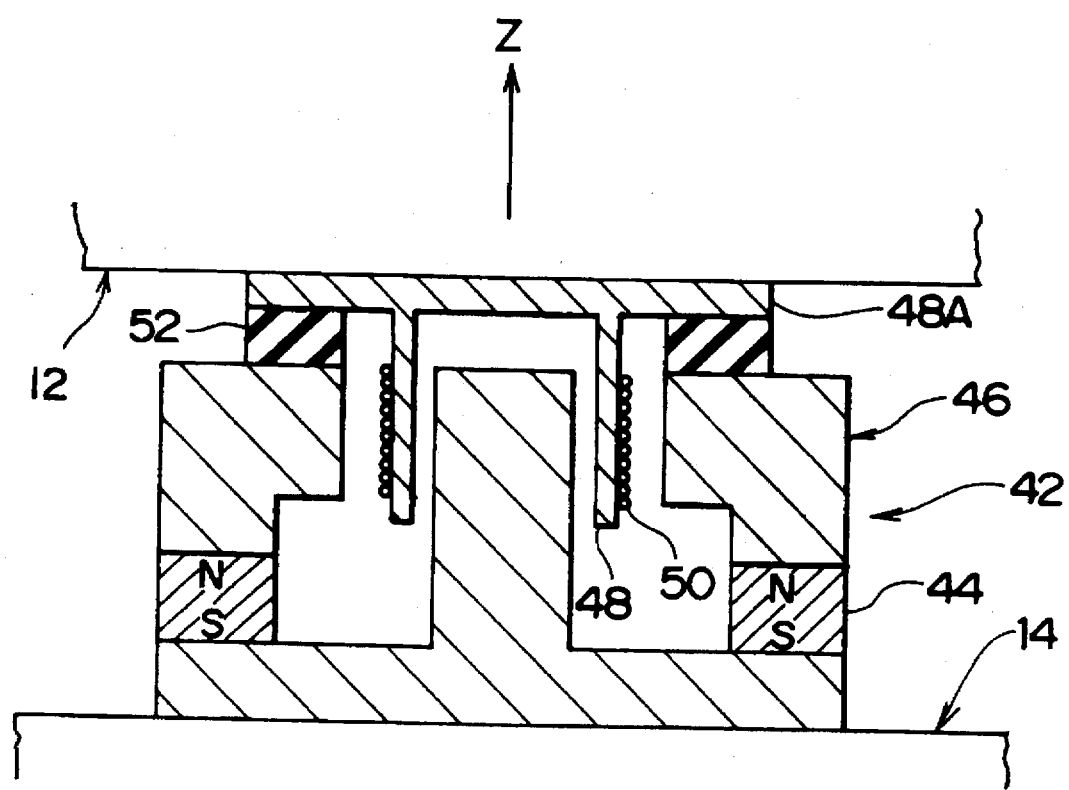
FIG. 3 is a longitudinally cross-sectional view of a vibration Isolating apparatus according to a second embodiment of the present invention.

As shown in FIG. 3. a vibration isolating apparatus 42 for control vertical vibration is disposed between the vibration isolating table 12 and the floor 14. The vibration isolating apparatus 42 includes a pot-type yoke 46 where a ring-shaped permanent magnet 44 is built in. A shaft center of the yoke 46 is disposed along a direction perpendicular to the floor 14. A coil 50 wound around a cylindrical bobbin 48 is inserted in a gap in such a manner as not to contact the yoke 46. When an electric current is applied to the coil 50, force acting in the vertical direction can be generated in the coil 50.

A flange 48A is formed integrally with an upper end of the bobbin 48 and is mounted on a bottom surface of the vibration isolating table 12. A lower-surface outer peripheral portion of the flange 48A and an upper surface of the yoke 46 are connected with each other via a ring-shaped elastic body 52. The elastic body 52 is used to hold the coil 50 at a predetermined position with respect to the yoke 46. The elastic body 52 is made of extremely flexible rubber, sponge or the like. Meanwhile, it suffices that the elastic body 52 be softer than the vibration absorbing device 16, and various rubber materials, soft urethane material or the like can be used therefor. Accordingly, vibration of the floor 14 transmitted to the vibration isolating table 12 via the elastic body 52 can be substantially regarded as nullity.

The coil 50 is connected to the controlling device 40 (not shown in FIG. 3), to which an acceleration sensor (not shown) is connected. The acceleration sensor is mounted on the vibration isolating table 12 so as to detect an acceleration of vertical vibration.

A horizontal movement of the vibration isolating table 12 in this embodiment can be restrained by the vibration isolating apparatus 10 (not shown in FIG. 3) in the same manner as the first embodiment.

Further, if the vibration isolating table 12 is going to slightly move in the vertical direction, the controlling device 40 receives an acceleration detecting signal from the acceleration sensor and controls an electric current applied to the coil 50 so as not to vibrate the vibration isolating table 12. As a result, even when the vertical vibration transmitted from the floor 14 cannot be completely prevented by the vibration absorbing devices 16, vibration of the vibration isolating table 12 can be controlled by the vibration isolating apparatus 42.

Meanwhile, the shape of the yoke 26 is not limited to those of the above-described first and second embodiments, various modifications can be applied. Modified examples of the yoke 26 will be illustrated hereinafter with reference to FIGS. 5 through 8.

Figure 5:
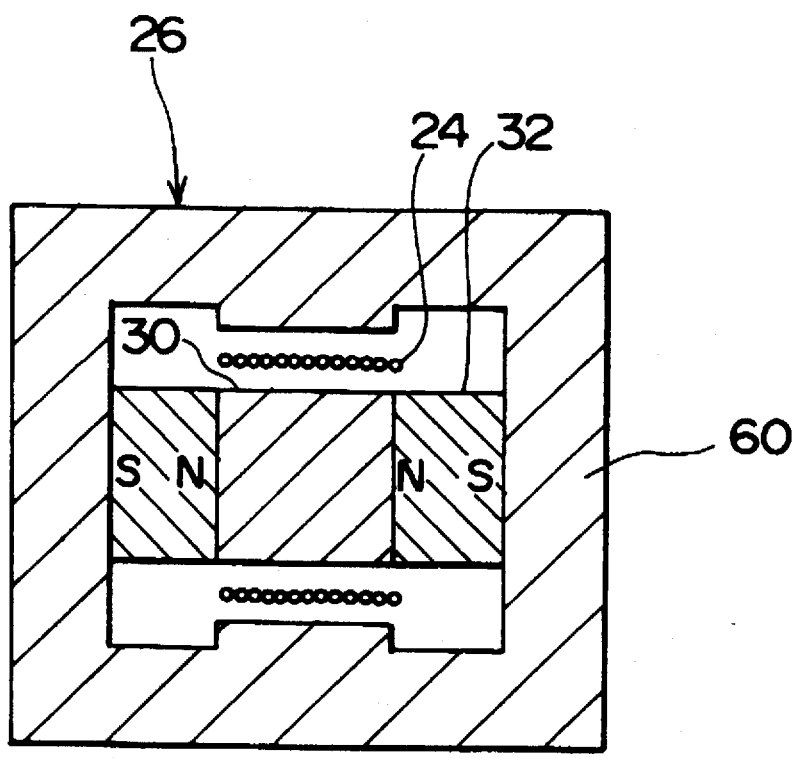
FIG. 5 is a modified example of a yoke.

The yoke 26 shown in FIG. 5 is formed in such a manner that the second member 30 is supported by a frame-shaped magnetic substance body 60 at the center thereof via a pair of permanent magnets 32.

Figure 6:
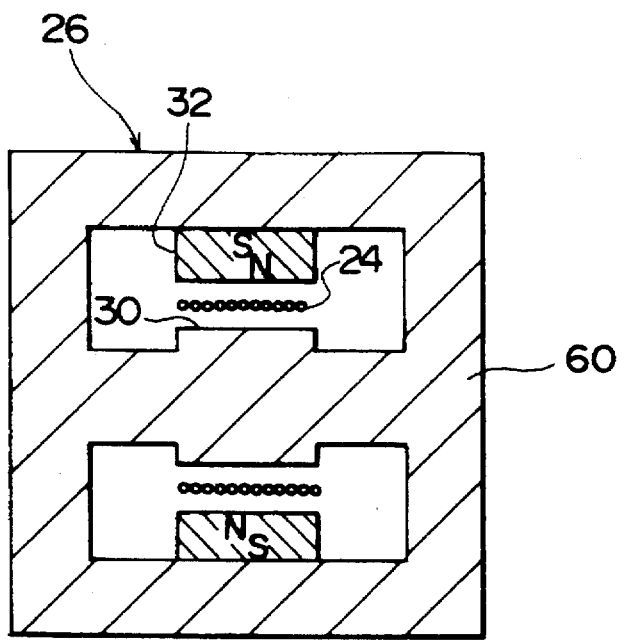
FIG. 6 is another modified example of the yoke.

The yoke 26 shown in FIG. 6 is formed in that the magnetic substance body 60 and the second member 80 are connected to be formed integrally, and the pair of permanent magnets 32 are each fixed to the magnetic substance body 60 in such a manner as to face the coil 24.

Figure 7:
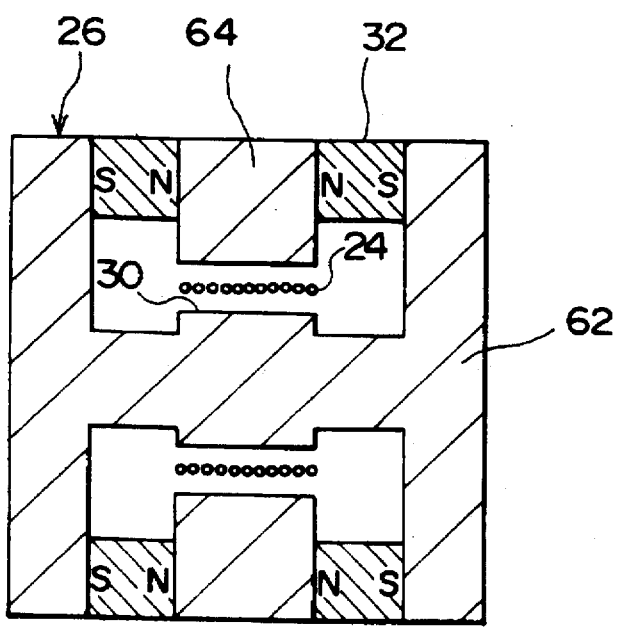
FIG. 7 is still another modified example of the yoke.

Further, the yoke 26 shown in FIG. 7 is formed in that prism-shaped magnetic substance bodies 64 are each held between end portions of one side of an H-shaped magnetic substance body 62 via the pair of permanent magnets 32.

Figure 8:
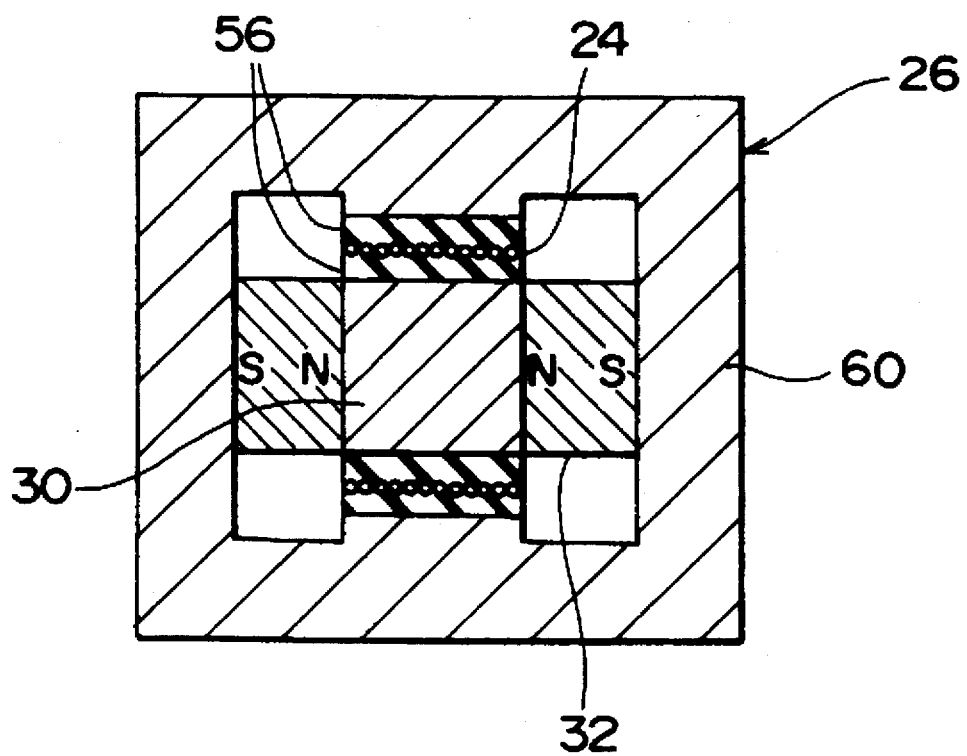
FIG. 8 is a further different modified example of the yoke.

Meanwhile, although the above-described yoke 26 and the coil 24 are provided in a non-contact state, the coil 24 may be held with an extremely flexible elastic body 56 being disposed between the coil 24 and the yoke 26, as shown in FIG. 8. As this elastic body 56, for example, rubber, sponge or the like, i.e., those having such an extent of 45 degrees at Asker hardness C, can be used. As a result, the vibration isolating apparatus 10 can be easily mounted on the vibration isolating table 12 or the like with the coil 24 being held at a predetermined position. Meanwhile, since the elastic body 56 is extremely flexible, even when the vibration isolating apparatus 10 having the elastic body 56 is applied to the vibration isolating table 12, transmittance of vibration from the floor 14 to the vibration isolating table 12 is restrained so as to be substantially regarded as nullity.

[Third Embodiment]

A third embodiment of the present invention is described hereinafter with reference to FIG. 4. A vibration isolating table 12 of this embodiment is formed in such a manner as to control vibration in a rotational direction of the vibration isolating table 12, i.e., in the direction indicated by arrow R. It should be noted that the same members as those of the first embodiment will be denoted by the same reference numerals, and a description thereof will be omitted.

Figure 4:
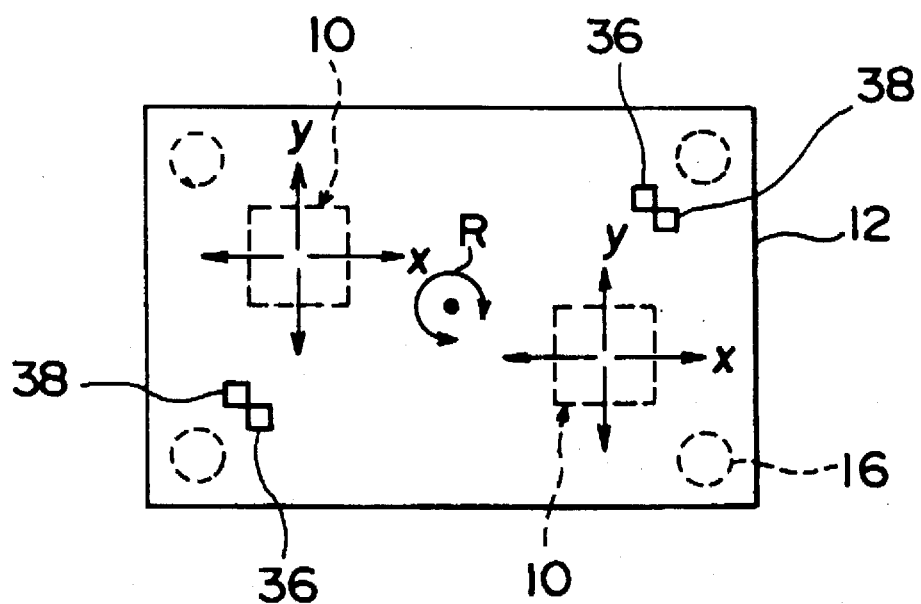
FIG. 4 is a plan view of a vibration isolating table according to a third embodiment of the present invention, in which rotation of the vibration isolating table can be prevented.

As shown in FIG. 4, the vibration isolating table 12 of this embodiment is provided with two vibration isolating apparatuses 10 disposed along a diagonal line of the vibration isolating table 12. Further, the acceleration sensor 36 and the acceleration sensor 38 are formed in pairs and two sets of the acceleration sensors 36, 38 are respectively provided along the diagonal line.

In this embodiment, vibration of the vibration isolating table 12 in the rotational direction is detected by the two sets of the acceleration sensors 36, 38 provided along the diagonal line and two vibration isolating apparatuses 10 on the diagonal line are respectively controlled, which makes it possible to control vibration of the vibration isolating table 12 in the rotational direction thereof.

[Fourth Embodiment]

Figure 10:
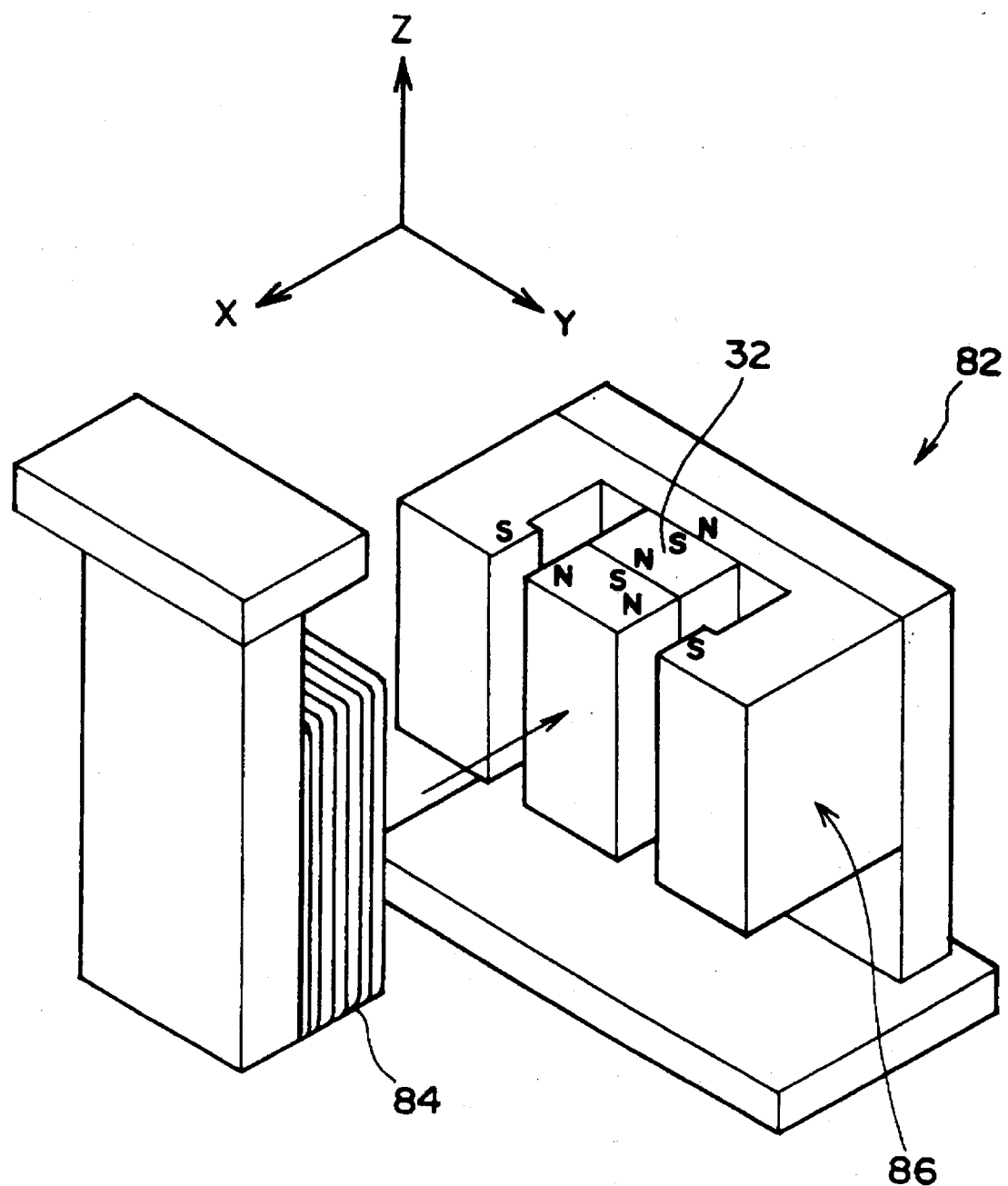
FIG. 10 is a perspective view of the vibration isolating apparatus according to the fourth embodiment.
Figure 11:
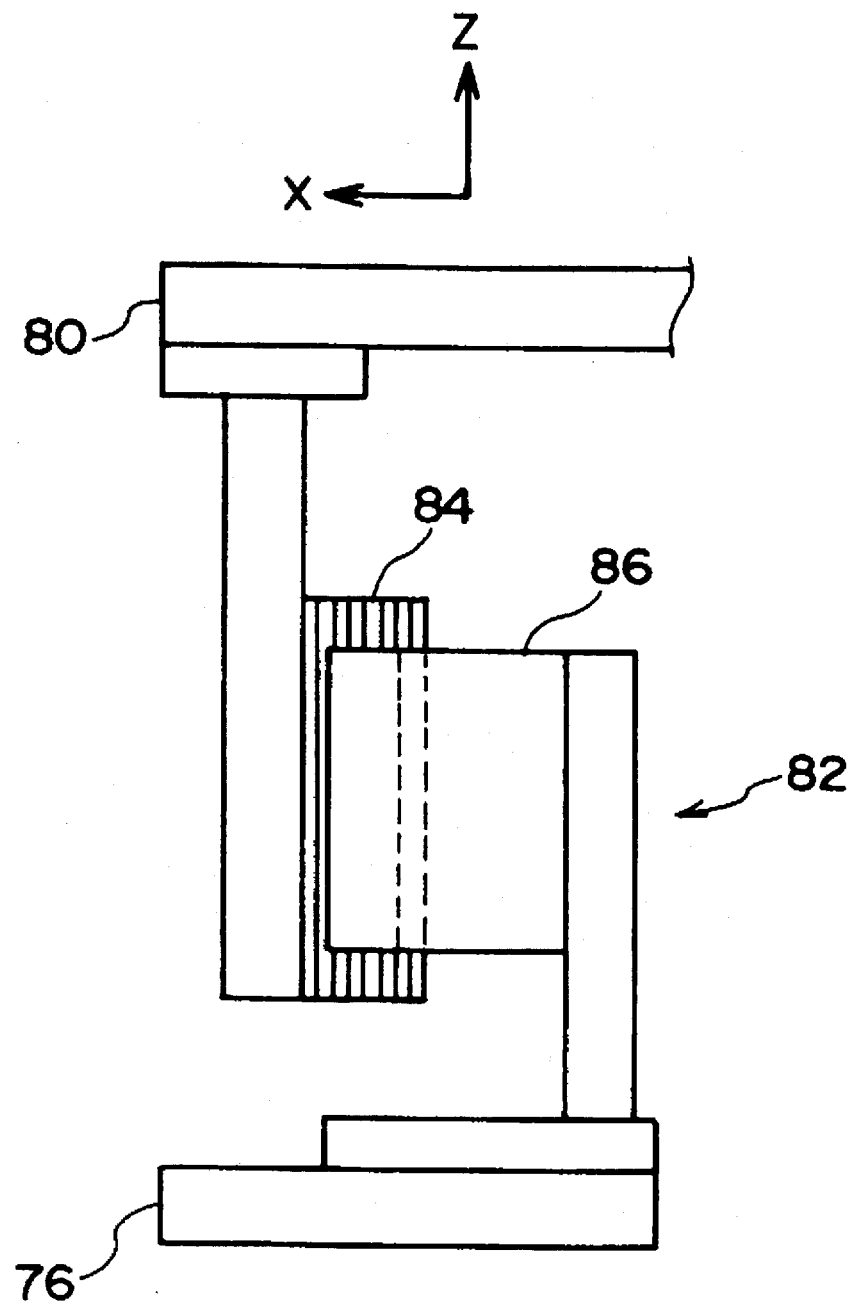
FIG. 11 is a side view of the vibration isolating apparatus according to the fourth embodiment.
Figure 12:
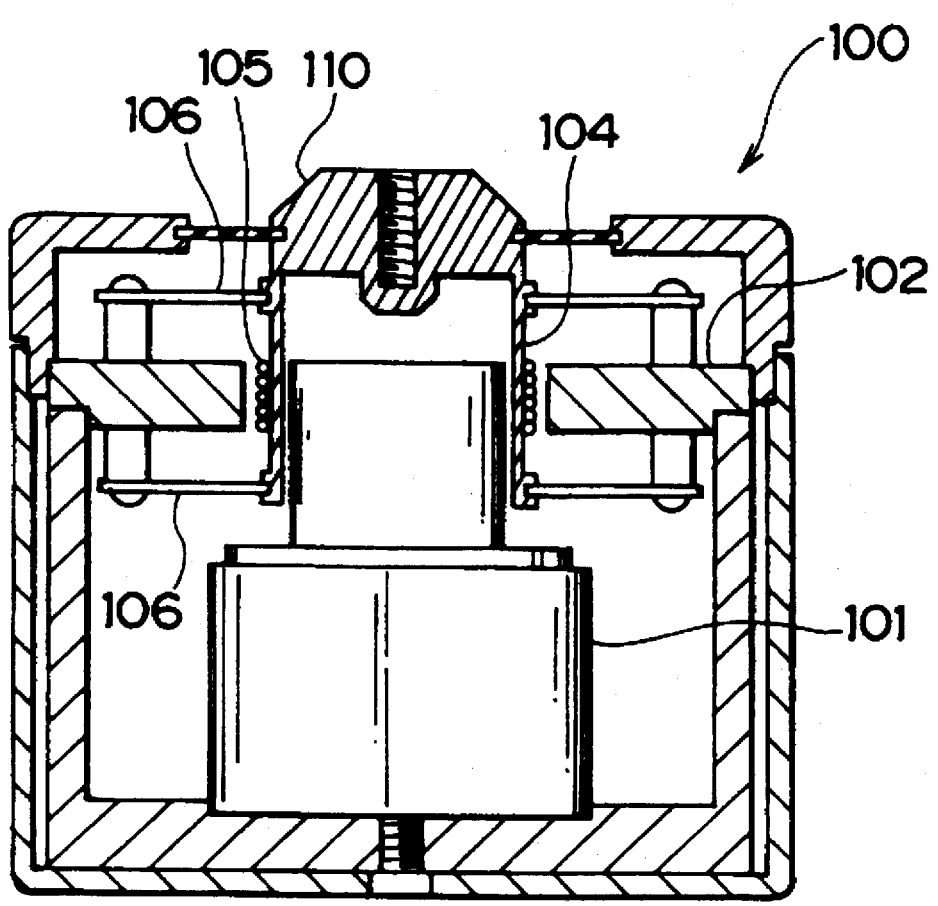
FIG. 12 is a cross-sectional view of a conventional electromagnetic actuator.
Figure 13:
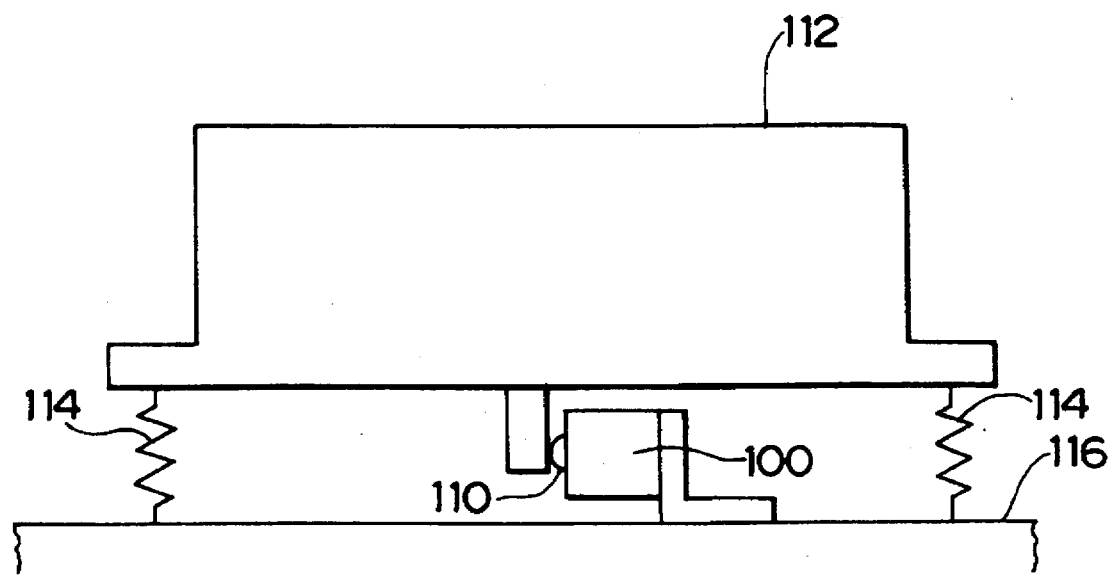
FIG. 13 is a side view of a vibration isolating table on which the conventional electromagnetic actuator is mounted.

A fourth embodiment of the present invention is described hereinafter with reference to FIGS. 9 through 11. It should be noted that the same members as those of the first embodiment will be denoted by the same reference numerals, and a description thereof will be omitted.

Figure 9:
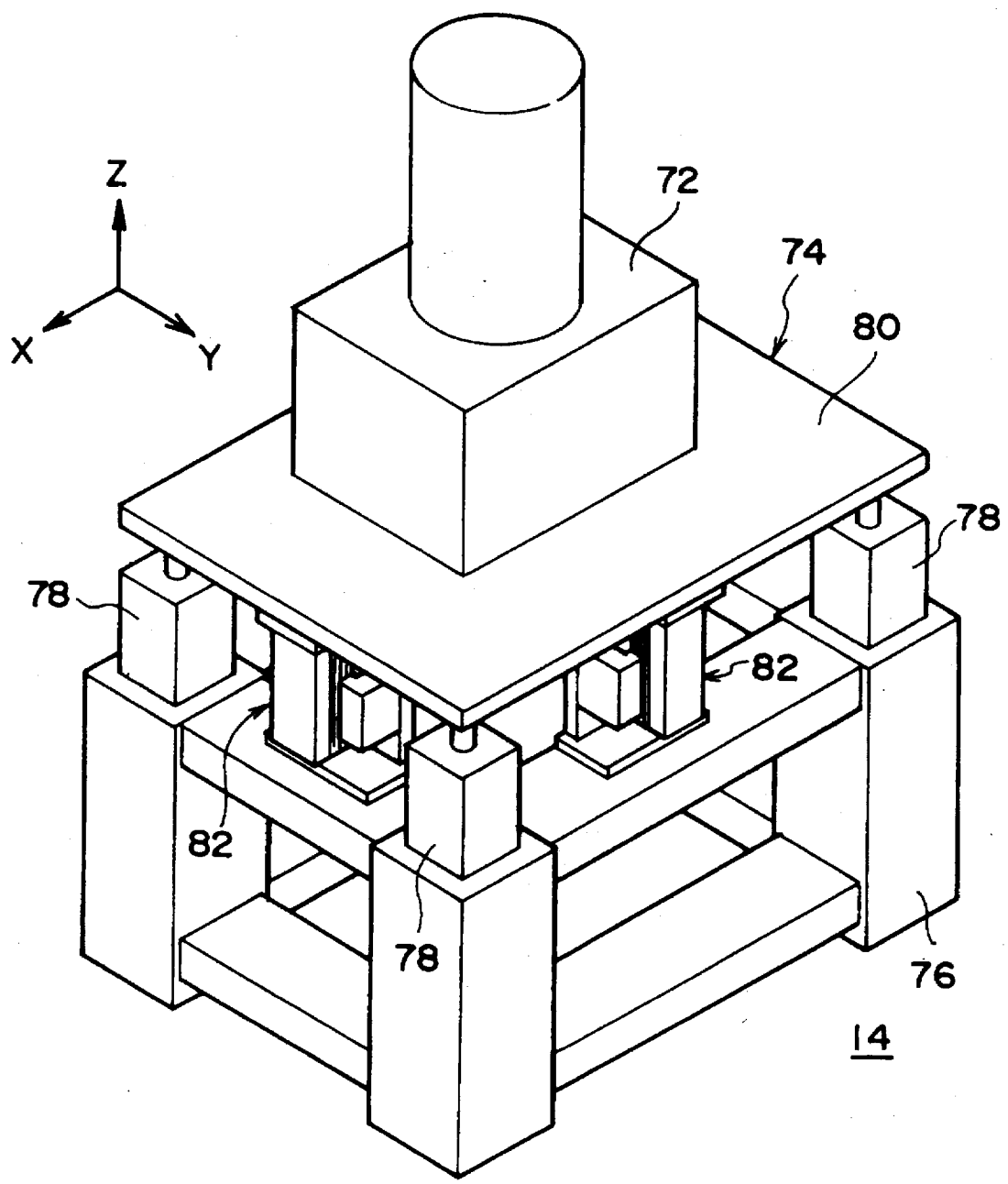
FIG. 9 is a perspective view of an electron-microscope supporting table to which a vibration isolating apparatus according to a fourth embodiment of the present invention is applied.

As shown in FIG. 9, a microscope table 74 serving as a vibration isolating table on which an electron microscope 72 is mounted is disposed on the floor 14. The microscope table 74 includes a supporting base 76 made of a high rigid member such as steel material or the like. An air spring 78 is mounted on each of four corners of an upper surface of the supporting base 76. A rectangular plate material 80 made of a high rigid material is mounted on and fixed to upper portions of these air springs 78. Meanwhile, each of the air springs 78 is formed with a spring constant thereof in the vertical direction being set small. Accordingly, the vertical vibration of the floor 14 can be shut off.

Vibration isolating apparatuses 82 are provided on an upper surface of the supporting base 76 between each two of the air springs 78. The vibration isolating apparatus 82 of this embodiment has substantially the same structure as the vibration isolating apparatus 10 of the first embodiment. However, as shown in FIGS. 10 and 11, this embodiment is constructed in that a longitudinal direction of the coil 84 is different from that of the coil 24 of the first embodiment by 90 degrees and is disposed along the vertical direction. As a result, a direction of the yoke 86 is also different from that of the yoke 26 of the first embodiment by 90 degrees.

In FIG. 9, the vibration isolating apparatus 82 for preventing vibrations in the direction indicated by arrow X and a direction opposite thereto is disposed to face in a direction in which the plate material 80 is moved in the direction of arrow X and the direction opposite thereto. The vibration isolating apparatus 82 disposed along the direction indicated by arrow Y and the vibration isolating apparatus 82 along a direction opposite to that of arrow Y (not shown) are respectively disposed to face in directions in which the plate material 80 is moved in the direction of arrow Y and the direction opposite thereto. Meanwhile, the electron microscope 72 is mounted on and fixed to the plate material 80.

In each of the vibration isolating apparatuses 82 of this embodiment, the coil 84 can move very easily in the vertical direction. For this reason, when the plate material 80 supported by the air springs 78 each having a low spring constant is moved in the vertical direction by operating the electron microscope 72, the coil 84 and the yoke 86 can be prevented from contacting each other.

Meanwhile, vibration of the plate material 80 in the horizontal direction is controlled by the vibration isolating apparatuses 82 in the same manner as the first embodiment.

What is claimed is:

1. A vibration isolating apparatus comprising:
   magnetic force generating means having a gap which allows magnetic flux to pass through in a direction intersecting a vibration direction and is fixedly mounted to one of a vibration generating portion and a vibration receiving portion;
   conducting means which extends in a direction perpendicular to the magnetic flux passing through the gap and in a direction perpendicular to a predetermined vibration direction of the vibration generating portion and which is disposed within the gap in a state of being separated from said magnetic force generating means by a predetermined distance, said conducting means being connected to another of the vibration generating portion and the vibration receiving portion; and controlling means which charges said conducting means with an electric current so as to allow said conducting means to generate force acting in a direction opposite to the predetermined vibration direction with respect to said magnetic force generating means.

2. A vibration isolating apparatus according to claim 1, wherein said conducting means and said magnetic force generating means are disposed in a non-contact state.

3. A vibration isolating apparatus according to claim 1, wherein two each of said magnetic force generating means and said conducting means are provided, and one side of magnetic force generating means and conducting means are disposed apart from another side of magnetic force generating means and conducting means so as to correct both vibration amounts of one vibration direction and a direction opposite thereto as well as of another vibration direction and a direction opposite thereto.

4. A vibration isolating apparatus according to claim 1, wherein said conducting means is a coil having the shape of a rectangular frame.

5. A vibration isolating apparatus according to claim 1, wherein said controlling means includes:

a detecting portion which detects a detection value corresponding to a vibration amount in the predetermined vibration direction; and a controlling device which calculates a current value for reducing the vibration amount in accordance with the detection value detected by said detecting portion and which charges said conducting means with an electric current of the calculated current value.

6. A vibration isolating apparatus according to claim 5, wherein said detecting portion includes:

a first detecting portion for detecting a detection value corresponding to a vibration amount of one vibration direction; and a second detecting portion for detecting a detection value corresponding to a vibration amount of a direction different from the one vibration direction.

7. A vibration isolating apparatus according to claim 6, wherein said controlling device charges said conducting means with an electric current such that both vibration amounts of the one vibration direction and the direction different therefrom become minute.

8. A vibration isolating apparatus according to claim 6, wherein said first detecting portion and second detecting portion are both acceleration sensors.

9. A vibration isolating apparatus according to claim 1, wherein said magnetic force generating means includes:

a first magnetic substance member which has a substantially channel-shaped configuration including a pair of parallel portions facing each other and a base portion connecting respective longitudinal one ends of the pair of parallel portions;

a second magnetic substance member having a substantially prism-shaped configuration; and a permanent magnet having a substantially prism-shaped configuration and fixed between the base portion and said second magnetic substance member, said permanent magnet having an N pole on a side of said second magnetic substance member.

10. A vibration isolating apparatus according to claim 9, wherein the pair of parallel portions facing each other are respectively provided with projecting portions between which the magnetic flux flows, which are formed on a side opposite to the base portion, and the gap is provided between the projecting portions.

11. A vibration isolating apparatus according to claim 10, wherein said conducting means is inserted into the gap in a state of non-contacting said first magnetic substance member, said second magnetic substance member and said permanent magnet.

12. A vibration isolating apparatus according to claim 1, wherein said magnetic force generating means includes:

a first magnetic substance member which has a disk-shaped configuration including a columnar portion projecting from said first magnetic substance member at the center thereof;

a permanent magnet having a ring-shaped configuration and fixed to an upper surface of an outer peripheral edge portion of said first magnetic substance member, said permanent magnet having an S pole on a side where said permanent magnet is fixed to said first magnetic-substance member;

a second magnetic substance member having a ring-shaped configuration and fixed to an upper surface of said permanent magnet, said second magnetic substance member having a projection formed on an inner peripheral surface of said second magnetic substance member so as to allow the magnetic flux to flow in the gap;

an elastic body having a ring-shaped configuration and fixed to an upper surface of said second magnetic substance member; and said conducting means includes a vibration isolating table setting means whose lower-surface edge portion is fixed to an upper surface of said elastic body and which has a cylinder portion projecting from a lower surface of said vibration isolating table setting means at the center thereof so as to surround said columnar portion in a state of non-contacting the columnar portion, an upper surface of said vibration isolating table setting means being fixedly connected to a vibration isolating table.

13. A vibration isolating apparatus according to claim 12, wherein a projected peripheral surface is formed on an inner periphery of said second magnetic substance member so as to allow said magnetic flux to flow, and said gap is provided on an inside of the projected peripheral surface.

14. A vibration isolating apparatus according to claim 13, wherein said conducting means includes a conducting element disposed in such a manner as to be wound around the cylinder portion projecting from the vibration isolating table setting means and in a state of non-contacting said first magnetic substance member, said second magnetic substance member and said permanent magnet.

15. A vibration isolating apparatus according to claim 1, wherein said magnetic force generating means includes:

a first magnetic substance member having a substantially rectangular frame and prism-shaped configuration and having projecting portions which are respectively formed at central portions and in vicinities thereof of one pair of facing parallel portions and which allow the magnetic flux to flow therebetween, said first magnetic substance member being disposed in a state of not contacting said conducting means;

a second magnetic substance member which is disposed at a position facing said projecting portions in such a manner as to non-contact said conducting means and which has a substantially prism-shaped configuration; and two permanent magnets each having a prism-shaped configuration and each of which S pole is fixed to each of another pair of facing parallel portions of said first magnetic substance member and each of which N pole is fixed to said second magnetic substance member on a side surface thereof perpendicular to a direction in which said second magnetic substance member faces the projecting portions.

16. A vibration isolating apparatus according to claim 15, wherein said magnetic force generating means further comprises two elastic members holding said conducting means and being fixed to the projecting portions and said second magnetic substance member.

17. A vibration isolating apparatus according to claim 1, wherein said magnetic force generating means includes:

a magnetic substance member having a substantially rectangular frame and prism-shaped configuration, having a connecting portion which connects respective central portions and their vicinities of one pair of facing parallel portions, and having projecting portions respectively formed on both sides of the connecting portion at the central portion and it vicinities thereof so as to allow the magnetic flux to flow, said magnetic substance member being disposed in a state of non-contacting said conducting means; and two permanent magnets each having a substantially prism-shaped configuration and each of which S pole is fixed to a central portion of the rectangular frame facing parallel projecting portions of said magnetic substance member such that the gap is provided between an N-pole side of each said permanent magnets and the projecting portion, said permanent magnets each being disposed in a state of not contacting said conducting means.

18. A vibration isolating apparatus according to claim 1, wherein said magnetic force generating means includes:

a first magnetic substance member having a substantially It-shaped configuration and having projecting portions which are formed on both sides of a connecting portion for connecting a pair of facing parallel portions at a central portion and its vicinities of the connecting portion so as to project in a direction perpendicular to that in which the connecting portion connects the parallel portions, said first magnetic substance member being disposed in a state of non-contacting said conducting means;

two second magnetic substance member each having a prism-shaped configuration and being disposed to face one of the projecting portions, said two second magnetic substance member being disposed in a state of not contacting said conducting means; and four permanent magnets each having a prism-shaped configuration and of which S poles being respectively fixed to leading end portions and their vicinities of the pair of facing parallel portions and of which N poles being respectively fixed to side surfaces of said second magnetic substance members, which are perpendicular to the projecting portions of said first magnetic substance member.

19. A vibration isolating table supported by a vibration generating portion via elasticity means, comprising:

magnetic force generating means having a gap which allows magnetic flux to pass through in a direction intersecting a vibration direction and is fixedly mounted to one of a vibration generating portion and a vibration receiving portion;

conducting means which extends in a direction perpendicular to the magnetic flux passing through the gap and in a direction perpendicular to a predetermined vibration direction of the vibration generating portion and which is disposed within the gap in a state of being separated from said magnetic force generating means by a predetermined distance, said conducting means being fixedly mounted to another of the vibration generating portion and the vibration receiving portion; and controlling means which charges said conducting means with an electric current so as to allow said conducting means to generate force acting in a direction opposite to the predetermined vibration direction with respect to said magnetic force generating means.

20. A vibration isolating table, comprising:

first magnetic force generating means having a gap which allows magnetic flux to pass through in a direction intersecting a vibration direction and is fixedly mounted to one of a vibration generating portion and a vibration receiving portion;

first conducting means which extends in a direction perpendicular to the magnetic flux passing through the gap and in a direction perpendicular to a predetermined vibration direction of the vibration generating portion and which is disposed within the gap in a state of being separated from said first magnetic force generating means by a predetermined distance, said first conducting means being fixedly mounted to another of the vibration generating portion and the vibration receiving portion;

second magnetic force generating means having a gap which allows magnetic flux to pass through in a direction intersecting a vibration direction and is fixedly mounted to one of the vibration generating portion and the vibration receiving portion;

second conducting means which extends in a direction perpendicular to the magnetic flux passing through the gap and in a direction perpendicular to a predetermined vibration direction of the vibration generating portion and which is disposed within the gap in a state of being separated from said second magnetic force generating means by a predetermined distance, said second conducting means being fixedly mounted to another of the vibration generating portion and the vibration receiving portion;

first detecting means having a first detecting portion and a second detecting portion, the first detecting portion detecting a vibration amount in one vibration direction with respect to said first magnetic force generating means of said first conducting means and the second detecting portion detecting a vibration amount in a direction different from one vibration direction;

second detecting means having a third detecting portion and a fourth detecting portion, the third detecting portion detecting a vibration amount in one vibration direction with respect to said second magnetic force generating means of said second conducting means and the fourth detecting portion detecting a vibration amount in a direction different from one vibration direction, the third detecting portion and the fourth detecting portion being disposed at a position separated from the first detecting portion and the second detecting portion; and controlling means which charges said first conducting means and said second conducting means with an electric current based on respective detection values detected by the first, second, third and fourth detecting portion such that a rotational angle of said vibration isolating table in a rotational direction thereof becomes zero.

21. The vibration isolating apparatus according to claim 1, wherein said conducting means is a coil having a rectangular frame shape and said magnetic force generating means includes a magnetic substance member having a rectangular cross section, a longitudinal axis of said frame shape coil being greater than a parallel axis of said magnetic substance member so that a range of relative movement of said magnetic substance member and said frame shaped coil is greater than an expected amplitude of vibration.

* * * * *